Aug. 14, 1945.   D. W. HOPKINS   2,382,720
SOLENOID TRIP BUTTERFLY VALVE
Filed Sept. 17, 1942
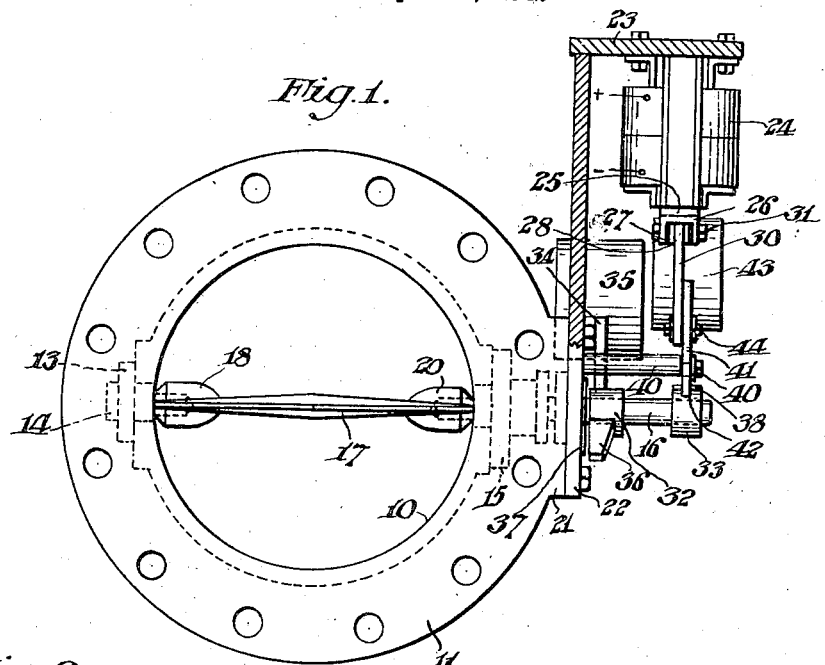
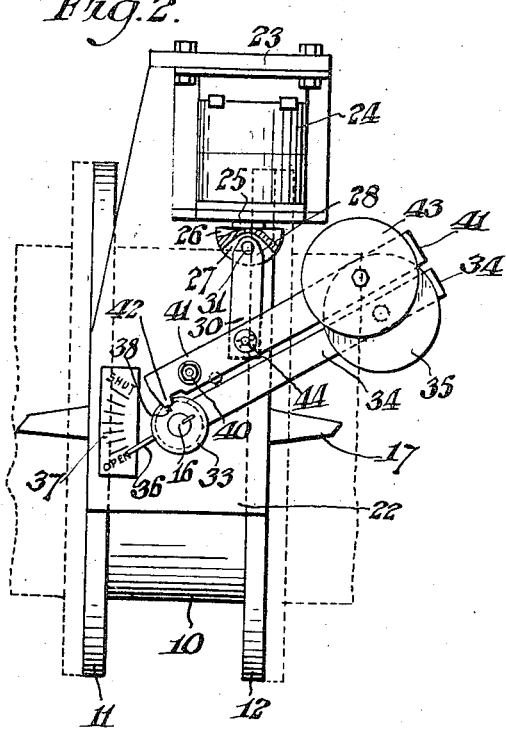
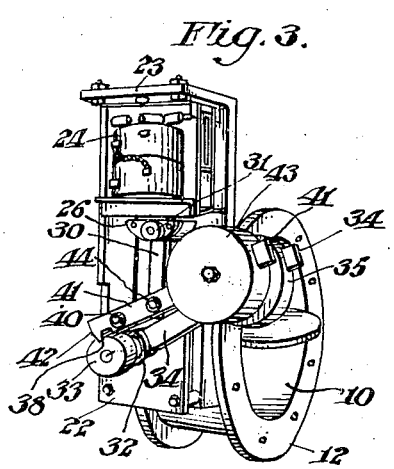
INVENTOR:
David W. Hopkins,
BY
Barr, Borden & Fox
ATTORNEY Patented Aug. 14, 1945

2,382,720

UNITED STATES PATENT OFFICE 2,382,720

SOLENOID TRIP BUTTERFLY VALVE

David W. Hopkins, Philadelphia, Pa.

Application September 17, 1942, Serial No. 458,715

3 Claims. (Cl. 137—139)

This invention relates to solenoid trip butterfly valves.

There are many installations of valves which require a quick and positive valve operation upon the happening of a certain contingency, such as the failing of a power supply, or the closing of a switch or the like. In some instances, the point of control is quite remote from the valve itself, and a positive and certain functioning of the valve is required.

It is among the objects of this invention: to improve generally the art of valves; to provide a solenoid trip valve of positive and prompt functioning; to provide a valve and solenoid trip assembly such that the failure of the power line to the solenoid causes positive actuation of the valve; to provide a compact unit of solenoid and valve actuating members arranged for mounting operatively upon the torque shaft of a valve to control same; to utilize the relatively short stroke of a solenoid core with an automatic valve operator; and many other objects and advantages will become more apparent as the description proceeds.

In the accompanying drawing forming part of this description,

Fig. 1 represents a front elevation of the assembled valve and solenoid assembly.

Fig. 2 represents a side elevation of the same, and

Fig. 3 represents a perspective of the same.

The preferred embodiment of the valve is a butterfly valve having a shaft to which torque is applied to swing the butterfly vane between open and closed positions. A weight is mounted on the end of an arm splined to the shaft to develop the necessary torque through gravity; while a second arm is asymmetrically pivoted close to the axis of the shaft and has a short pawl or detent end with a finger or dog engaging in a locking hub, also keyed on the vane shaft, and which finger is normally held in locking position by the solenoid core which is pivoted to the second mentioned arm between its pivot and its weight.

The valve, which may be of any desired sort which is controlled by torque applied to a shaft, but which is preferably a butterfly valve, comprises a cylindrical housing 10 having front and rear attaching flanges 11 and 12 respectively, as is common in such valves. A boss 13 having an aperture to receive a stub shaft 14 is provided in the housing as a support for the vane on one side of the flow passage in housing 10, and diametrically opposite thereto an apertured boss 15 is provided to receive the main vane torque shaft 16. The butterfly vane 17 of the valve preferably has either a diametrically continuous boss, or a pair of aligned oppositely extending bosses 18 and 20, suitably apertured to receive the ends of the respective shafts 14 and 16, with boss 20 suitably secured to the shaft 16 so that the vane and shaft turn together. The flanges 11 and 12 of the valve have flattened bosses 21 to which the supporting plate 22 is secured, and the latter supports the solenoid mounting plate 23. The solenoid 24 is carried by the plate 23 so that its axis is parallel to plate 22 and normal to the axis of the shaft 16, which latter extends outwardly of and through the plate 22 as indicated in Figs. 1 and 3. The solenoid 24 has a floating core 25, the lower end of which is preferably mushroomed as at 26, and is formed with a lower recess 27, within which the upper end 28 of a link 30 is pivoted, as at 31. The pivot 31 is so arranged that the link 30 can swing in a plane normal to the axis of the shaft 16. The wiring and control of the solenoid itself will be in accordance with the necessities of the installation, and preferably in the usual course will be energized so as to hold the core in during all normal uses of the system, and be arranged for deenergization when the power fails, so that the core drops out.

The torque shaft 16 of the valve carries either a single continuous hub or, and preferably, a pair of parallel similar apertured hubs, respectively a torque hub 32 and a detent hub 33, with the latter generally aligned with the path of swing of the link 30. The torque hub 32, preferably next to the valve housing, carries an integral lever arm 34 upon which a weight 35 is preferably adjustably mounted toward the lever's free end. The leverage is preferably such that under the influence of gravity alone the released arm and weight 34 and 35 will exert sufficient torque on the shaft 16 as to positively actuate the valve in the desired direction. Illustratively, the valve is normally open, with the weight 35 and arm 34 raised, as shown in Fig. 2, and the dropping thereof moves the valve toward closed. Obviously, however, the valve may be normally closed, and be arranged for opening upon the dropping of the torque weight. In this connection also, it will, of course, be evident that the valve movement need not be toward a position either fully open or fully closed as a mere variation in flow may be desired. The lever 34 and weight 35 together constitute a handle device by which the normal setting of the valve itself may be expeditiously accomplished. To indicate the actual position of the valve, a pointer 36 is carried by the lever hub preferably diametrically opposite to the arm 34, to sweep the arcuate scale or indicator 37 to continuously bear upon or lie over the graduation representative of the degree of valve opening.

The detent hub 33, which as noted is keyed to the torque shaft in predetermined fixed angular relation to the hub 32 and the lever and weight connected thereto, or may be a mere axial prolongation of hub 32, if desired, has a holding recess or opening 38. A fulcrum stud 40 is mounted rigidly upon the supporting plate 22, and its free end substantially overlies the detent hub 33. A detent arm 41 is journaled asymmetrically upon the stud 40, close to one end of the arm, and the latter end terminates in a downwardly directed pawl or detent member or finger 42 arranged to engage within the detent or holding recess 38 when the arm 41 is suitably raised on the other side of the pivot 40 from the pawl end. A detent weight 43 is mounted, preferably adjustably, upon the free end of the arm 41. The lower end of the solenoid link 30 is pivotally connected as at 44 to the detent arm 41, between the fulcrum 40 and weight 43, in such manner that with the solenoid energized the core is pulled in, and thus the link 30 is raised, raising and maintaining the weight 43 and arm 41 in an elevated position, while the pawl finger 42 engages and remains in locking engagement with the detent recess 38 of the detent hub 33, and the shaft 16 is thus prevented from turning.

In this functioning of the lever assembly just described, the lever arm 41 is a lever of the third class, with the fulcrum at the pivot 40, the weight at 43 and the power at 44. It will be clear that in the preferred embodiment disclosed, the third class lever cannot function to raise the weight 43, or to hold it raised, until after the torque shaft 16 has been turned far enough to raise the torque weight 35 and arm 34 to the desired angular position, when the valve is in the desired set position in which it is to be maintained during the time of excitation of the solenoid coil. The setting of the valve is a prerequisite to establishment of the required predetermined angular setting of the detent hub at a point such that the detent recess 38 is aligned with the pawl end 42 of the lever 41, as will be clear. Any suitable stop means may be resorted to as stops or abutments to limit the swings of the respective arms and levers on their pivots, as will be understood.

With the valve manually set to raise the weight 35, and with the solenoid suitably energized so as raise the core and thus apply power to raise the weight 43 of the third class lever disclosed, the pawl end 42 of the detent lever will enter the recess and hold the hub and thus the torque shaft against rotation under the influence of the weight 35. Upon failure of the power supply to the solenoid or upon switch-controlled tripping thereof, the power applied to the third class lever fails, as the core drops out by gravity and the link 30 moves down by gravity, because of the pull of the detent weight 43. The latter now energizes the lever 41 as a lever of the first class and swings about the fulcrum formed by the pivot 40 and withdraws the detent 42 from recess 38 of the detent hub. This then permits the weight 35, working through lever 34, to swing the torque shaft 16 automatically to actuate the valve as will be clear. The arrangements of weights and fulcrums shown is preferred, although not being essential. The preference is due to the fact that the stroke of the solenoid is comparatively short and at its extreme lower end is rather weak, so that the lever arrangement shown is most efficient for the purpose.

It will be understood that the assembly of supporting plates, 23 and 22, solenoid 24, links 30, lever arm 41 and weight 43, and its pivot, arm 34 and weight 35 and integral or separate hubs 32 and 33 may be formed as a separate unit for attachment to existing valves, or may be built in with the valve structure, as desired.

Having thus described my invention, I claim:

1. A valve mechanism comprising the combination of a valve including a torque shaft, a weight arm on the torque shaft of the valve arranged for movement with the torque shaft in a plane normal thereto, a detent hub extending coaxially with the torque shaft having a portion disposed axially beyond and in fixed relation to the arm and having a stop recess, a lever arm, means extending parallel to the torque shaft pivotally supporting the lever arm for movement in a plane substantially parallel to the plane of movement of the said weight arm, a weight on the lever arm on one side of the pivot thereof, a weight on the weight arm adjacent to but laterally spaced from the said weight on said lever arm, a pawl carried by the other end of the lever arm in position to engage said recess, a solenoid having a movable core, means supporting the solenoid in fixed relation to said pivot, and a link engaging the core of the solenoid and the lever arm and upholding the lever arm and its weight during solenoid energization, said first mentioned weighted arm being free to fall with the rotation of the torque shaft when the deenergiztion of the solenoid permits the lever arm to pivot and remove the pawl from the recess, the arrangement of stop recess, hub, and pawl being such that the lever arm cannot be reset until the valve has first been repositioned.

2. A valve mechanism comprising the combination of a valve having a torque shaft, a support on the valve, a solenoid having a floating core lying in a plane normal to the torque shaft, a hub secured on the torque shaft and having a detent recess, a stud on the support forming a pivot, a lever asymmetrically pivoted on the stud and having a detent finger in position to engage and disengage the detent recess, a weight on the lever, a link connecting the core of the solenoid to the lever between the pivot and the weight, and the whole so arranged that energization of the solenoid maintains the engagement of the detent and recess, a torque creating agency coupled with the shaft and arranged to actuate the shaft in a given direction from a condition of rest when the solenoid is deenergized.

3. A valve mechanism comprising the combination of a valve having a torque shaft, a support on the valve, a solenoid having a floating core the axis of which lies in a plane normal to the torque shaft and having two conditions one of which is during energization and the other of which is during deenergization, a hub secured on the torque shaft and having a detent recess, a stud on the support forming a pivot, a lever pivoted on the stud and having a detent in position to engage and disengage the detent recess, a weight on the lever, said weight and lever arranged to urge the detent out of the recess, a link connecting the core of the solenoid to the lever, and the whole being so arranged that with the solenoid in one condition the engagement of the detent and recess is maintained in opposition to said urge, a torque creating agency coupled with the shaft axially off-set from the detent recess of the hub and arranged to actuate the shaft in a given direction from a condition of rest when the solenoid is changed to its other condition by permitting said urge to function to separate the detent and recess.

DAVID W. HOPKINS.